US009545838B1

(12) United States Patent
Hill

(10) Patent No.: US 9,545,838 B1
(45) Date of Patent: Jan. 17, 2017

(54) HYBRID ALL-TERRAIN, FOUR-WHEEL DRIVE VEHICLE WITH TWO CYLINDER ENGINE

(71) Applicant: David Hill, Kingston Springs, TN (US)

(72) Inventor: David Hill, Kingston Springs, TN (US)

( * ) Notice: Subject to any disclaimer, the term of this patent is extended or adjusted under 35 U.S.C. 154(b) by 55 days.

(21) Appl. No.: 14/659,702

(22) Filed: Mar. 17, 2015

(51) Int. Cl.
| | | |
|---|---|---|
| *B60K 11/04* | (2006.01) |
| *B60K 5/02* | (2006.01) |
| *B60K 17/342* | (2006.01) |
| *B60K 17/344* | (2006.01) |
| *F02B 75/22* | (2006.01) |
| *B60K 5/12* | (2006.01) |
| *B62D 21/18* | (2006.01) |
| *B60T 1/06* | (2006.01) |
| *B60K 17/06* | (2006.01) |
| *F02B 75/18* | (2006.01) |
| *B60K 5/00* | (2006.01) |

(52) U.S. Cl.
CPC .............. *B60K 5/02* (2013.01); *B60K 5/1283* (2013.01); *B60K 17/06* (2013.01); *B60K 17/342* (2013.01); *B60K 17/344* (2013.01); *B60T 1/065* (2013.01); *B62D 21/183* (2013.01); *F02B 75/22* (2013.01); *B60K 2005/003* (2013.01); *F02B 2075/1808* (2013.01)

(58) Field of Classification Search
CPC ......... B60K 5/02; B60K 5/1283; B60K 17/06; B60K 17/342; B60K 17/344; B60T 1/065; B62D 21/183; F02B 75/22
USPC .............. 180/68.4, 908, 68.1, 244; 280/756; 296/185, 186; 224/42.45, 309
See application file for complete search history.

(56) References Cited

U.S. PATENT DOCUMENTS

| | | |
|---|---|---|
| 4,645,172 A | 2/1987 | Wilson |
| 4,723,623 A | 2/1988 | Teraoka et al. |
| 5,251,713 A * | 10/1993 | Enokimoto ............. B60R 5/003 180/68.4 |
| 5,566,591 A | 10/1996 | Burkett |
| 6,305,486 B1 | 10/2001 | Polzin et al. |
| 6,382,196 B2 | 5/2002 | Kawamoto et al. |
| 6,626,260 B2 | 9/2003 | Gagnon et al. |
| 6,749,039 B1 | 6/2004 | Uphaus |
| 6,910,987 B2 | 6/2005 | Richards |

(Continued)

OTHER PUBLICATIONS

Unk, Go-Karts, www.bajamotorsports.com, Product Page, Mar. 3, 2015, Unk, Unk.

(Continued)

*Primary Examiner* — Jacob Knutson
(74) *Attorney, Agent, or Firm* — Stan Collier, Esq.

(57) ABSTRACT

A v-twin motorcycle engine, 100 to 140 cubic inches (1600 cc to 2300 cc) is mounted longitudinally in a tubular chassis behind dual seats. A chain drive is mounted to the crankshaft that further drives a clutch device. A transmission/transfer unit is mounted in front of and below the engine and receives a clutch output shaft. The transfer case has two output drive shafts, one to a front differential and the other to a rear differential located under the engine. The differentials each have two shafts that drive the four wheels. The wheels have disk brakes and typical independent suspension for driven wheels of such types of vehicles. The present invention provides an off road, sports utility vehicle having the power between an ATV and a 4 cylinder (VW) engine. Further an adjustable engine mount allows for the selection of different engines.

16 Claims, 7 Drawing Sheets

(56) References Cited

U.S. PATENT DOCUMENTS

| | | | |
|---|---|---|---|
| 7,000,727 B2 | 2/2006 | Korenjak et al. | |
| 8,382,125 B2 | 2/2013 | Sunsdahl et al. | |
| 8,517,136 B2 | 8/2013 | Hurd et al. | |
| 9,102,205 B2 * | 8/2015 | Kvien | B60G 3/20 |
| 2001/0003980 A1 | 6/2001 | Kawamoto et al. | |

OTHER PUBLICATIONS

Unk, Flyer, Great Holiday Gift Ideas, Go-Kart, Dec. 2007, p. 1, 2, 3.
Unk, Polaris Ranger, Catalog, 2007, Unk, Unk, Unk.
Unk, Yamaha, Rhino, 2007, Product Catalog, Unk, Unk, Unk.

* cited by examiner

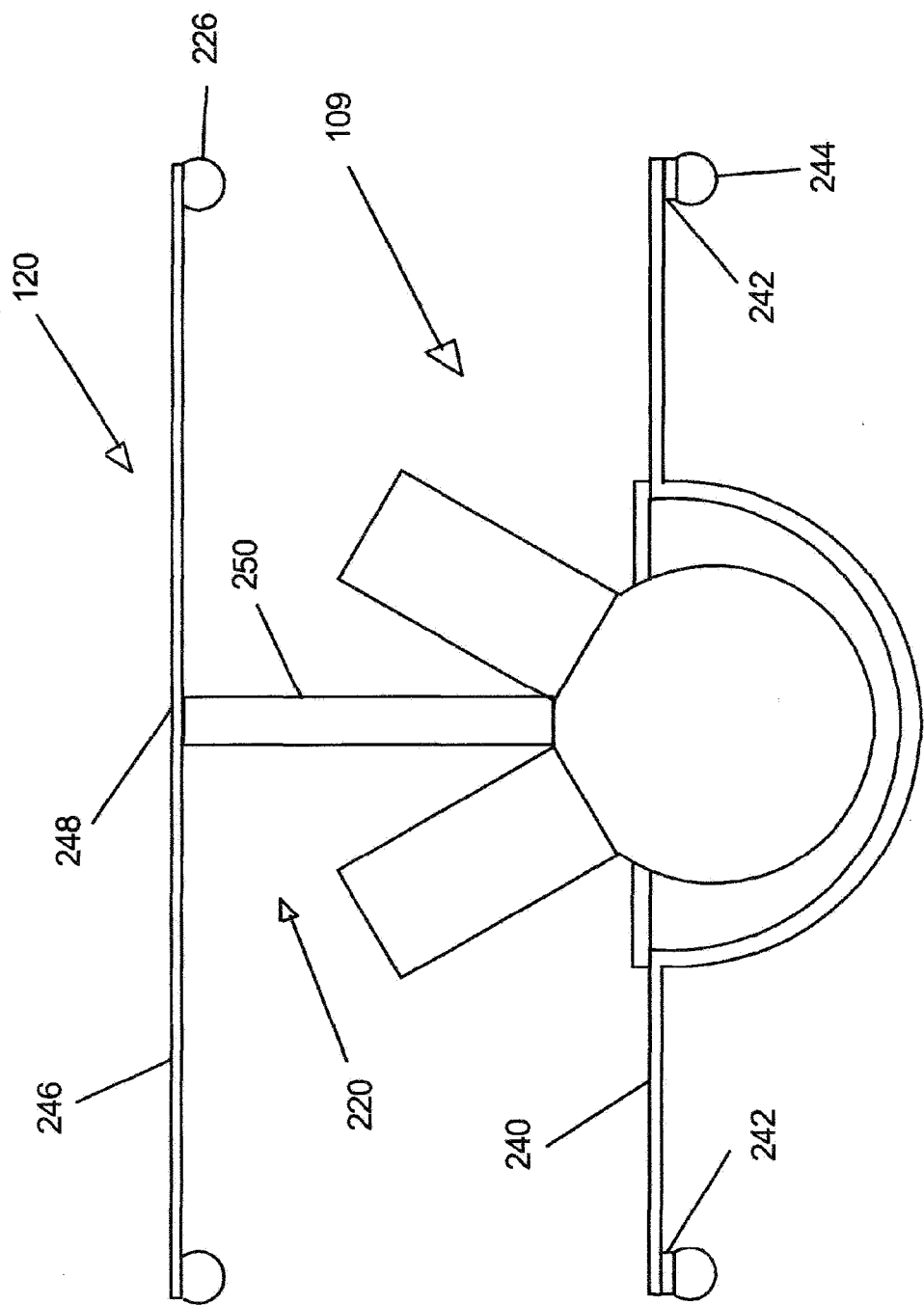

HYBRID ALL-TERRAIN, FOUR-WHEEL DRIVE VEHICLE WITH TWO CYLINDER ENGINE

CROSS REFERENCES TO RELATED APPLICATIONS

NA

REFERENCE TO FEDERALLY SPONSORED RESEARCH OR DEVELOPMENT

NA

REFERENCE TO JOINT RESEARCH AGREEMENTS

NA

REFERENCE TO SEQUENCE LISTING

NA

BACKGROUND OF THE INVENTION

Field of the Invention

The present invention relates generally to motorized vehicles, and, more particularly, relates to recreational four-wheel drive vehicles, and, with greater particularity, relates to such vehicles using V-twin engines having a displacement from about 1000 cc to about 1500 cc.

Description of the Prior Art

All-terrain vehicles or off-the-road vehicles or utility vehicle, or recreational vehicles like such have captured the interest of the weekend vehicle enthusiasts. These vehicles come in a wide variety of shapes, sizes, models, styles from a simple go-kart to v-8 powered sand dune buggies. The basic construction features involve a chassis and a drive train.

Go-karts come in several models. One model is especially designed for racing on tracks. These go-karts normally have a low center of gravity, no wheel suspension, no roll cage and usually a two-cycle, high performance engine from 100 to 200 cc; go-karts for dirt tracks typically have roll cages and have a high center of gravity with larger wheels. Other engines used may be four-cycle and even Wankel style rotary engines. Typical go-karts have a single seat that may be positioned for different types of racing venues. U.S. Pat. No. 7,000,727 is directed at a direct-drive racing go-kart using a Wankel style engine, and U.S. Pat. No. 6,749,039 is directed at a caged go-kart being approximately 24 by 50 inches in size designed to be shipped by mail. Some examples of typical go-karts are sold by Baja Motorsports® through Pep Boys Auto® under the name of "Trax Go-Kart," having two seats and large off-road tires. Another model is the "Blaster Go-Kart" with a 6.5 HP engine with larger off-road tires. A still larger and more featured model is the "Reaction 150 cc Go-Kart" with a 150 cc, 4-stroke, 9.2 HP engine. All of these models have a cage roll bar system.

Another type of recreational vehicle is the all-terrain vehicle (ATV). This type of vehicle is especially suited for off-road use in rough terrain. The ATV has four large tires, four-wheel drive, usually with single cylinders engine of less than about 20 HP, normally seats a single person/driver like a driver of a motorcycle, normally without a roll cage, and normally is geared to a lower speeds than the typical go-kart. They typically have engines of about 20 HP with a displacement from 200 to 300 cc. A typical ATV is sold by Baja Motorsports® under the name of "Camo 250 ATV" by Pep Boys Auto. It has a 250 cc 4 cycle engine of about 14 HP. U.S. Pat. Nos. 6,382,196 and 6,626,260 disclose an ATV.

Another style of recreational vehicle is the off-road utility vehicle. These are typically a larger version of the ATV and can normally seat two persons in car-like seats and also have roll cages with body covering. The engines range up to a 40 HP version, and single cylinder engines. Two examples of the off-road utility vehicles are sold by Yamaha® as the "Rhino"® and Polaris® as the "Ranger"®. These vehicles have engines of about 40 HP in the range of 700 cc and have a maximum speed up to about 50 MPH and may be two or four-wheel drive depending on the models. See U.S. Pat. No. 8,382,125, for example.

Off-road vehicles, normally two wheel driven, used as sand dune buggies typically have much larger engines such as the VW engine, 1.6 to 2.0 liters, of about 200 HP, and even larger V-6 and V-8 car engines for pushing performance to the limit in this unique environment. These types of engines have their limitations in this environment also. The VW bug engine is hard to modify to obtain higher horse power, higher torque output, and the car engines being water cooled have heating problems and are also not fuel efficient in the desert environment. Several examples of these vehicles are available. A much smaller version of this type of vehicle is the "Dune 250 Go-Kart" sold by Baja Motorsports® through Pep Boys Auto®. U.S. Pat. No. 5,251,713, issued to Honda Giken Kogyo Kabushiki Kaisha, discloses a two-wheel drive vehicle having a rear-mounted water-cooled engine. The frame is of tubular construction with an integral roll cage for two persons. A military version of the sand dune buggy is called the "Desert Patrol Vehicle (DPV)" and built by Chenowth Racing Products, Inc. It further employs a VW engine of about 200 HP. Although it was used for a short time by the military, it disadvantages caused it to be replaced with the HMMWVs, "Hummers," by the regular U.S. Army. A newer version of the DPV called the Light Strike Vehicle has been used by the special forces, but still has many disadvantages such as the lack of armor to even small arms fire. In order to avoid several problems associated with the use of car engines in dune buggies, U.S. Pat. No. 4,645,172 discloses the use of an adaptor plate wherein a motorcycle engine may replace the typical VW bug engine and drive the VW transaxle device, two wheel drive, that is used on these dune buggies.

All of the above references are incorporated by reference.

The above vehicles although providing some positive features fail to address the need for a new class of vehicle for off-road use.

Accordingly, there is an established need for an off-road vehicle having four-wheel drive that provides a high power engine without the disadvantages of the above vehicles.

SUMMARY OF THE INVENTION

The present invention is directed at a recreational vehicle being of the off-road style, four-wheel drive, and having a V-twin engine ranging in displacement from about 100 cubic inch to about 150 cubic inch.

A V-twin motorcycle engine, 100 to 140 cubic inches (1600 cc to 2300 cc), preferably, is mounted longitudinally in a tubular chassis behind dual seats. A chain drive is mounted to the crankshaft of the engine which further drives a clutch device. A transmission/transfer unit is mounted in front of and below the engine and in close proximity to the two seats and receives a clutch output shaft. The transfer case has two output drive shafts, one to a front differential and the other to a rear differential located under the engine. The differentials each have two shafts that drive the four wheels. The wheels have disk brakes and typical independent suspension for driven wheels of such types of vehicles. The present invention provides an off road, sports utility vehicle having the power between an ATV and a 4 cylinder (VW engine), or 6 or 8 cylinder car engines used in high power dune buggies.

In the present invention, the vehicle has a tubular chassis comprising an upper and a lower frame members with support and strengthening members therebetween. A roll cage is integral thereto. A front suspension section is integrally welded to the chassis as well as a rear suspension/engine section that allows for the placement of different sizes of engines as the customer may request. The V-twin engine is mounted horizontal to the chassis axis. A chain drive is mounted to the engine output shaft and is connected to a clutch. A transmission/transfer unit is mounted behind the seats of the chassis and connected to the clutch by a drive shaft. The transmission, automatic or manual, is connected to a transfer case that has a front drive shaft and a rear drive shaft which are in turn connected to a front differential and a rear differential. The differentials have wheel drive axle shafts therefrom with appropriate u-joints and brakes. Each wheel is mounted to an independent suspension attached to the front suspension section and the rear suspension section. A pair of performance seats are mounted in the rear area of the main chassis. Appropriate instruments and controls are further mounted in the chassis for use by the driver.

An object of the present invention is to provide a hybrid all-terrain, four-wheel drive vehicle.

Another object of the present invention is to provide a vehicle with a fully integral tubular chassis of high strength and light-weight metal.

It is another object of the present invention to provide a vehicle having a size between that of a utility vehicle (UTV) and that of a dune buggy.

It is a further object of the present invention to provide a vehicle having a substantial load capacity and towing capacity.

It is still a further object of the present invention to provide a vehicle having an engine between that of a conventional UTV and a dune buggy wherein it has high power, high torque and high performance.

It is still a further object of the present invention to provide a hybrid all-terrain, four-wheel drive vehicle using a V-twin motorcycle like-engine.

It is yet a further object of the present invention to provide an off-road vehicle having an exhaust sound equivalent to the sound of a traditional hog motorcycle well known to those skilled in the art.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 7 is an schematic illustration of the engine mounting within the rear chassis section of a preferred embodiment of the hybrid all-terrain vehicle of the present invention.

Like reference numerals refer to like parts throughout the several views of the drawings.

DETAILED DESCRIPTION OF THE PREFERRED EMBODIMENTS

The present invention is directed at a recreational vehicle being of the off-road style, four-wheel drive, and having a conventional V-twin engine ranging in displacement from about 100 cubic inch to about 150 cubic inch.

As a further preferred embodiment, the present invention provides for a custom drive train adapted to a V-twin engine for use in the off-road style vehicle.

Figure 1:
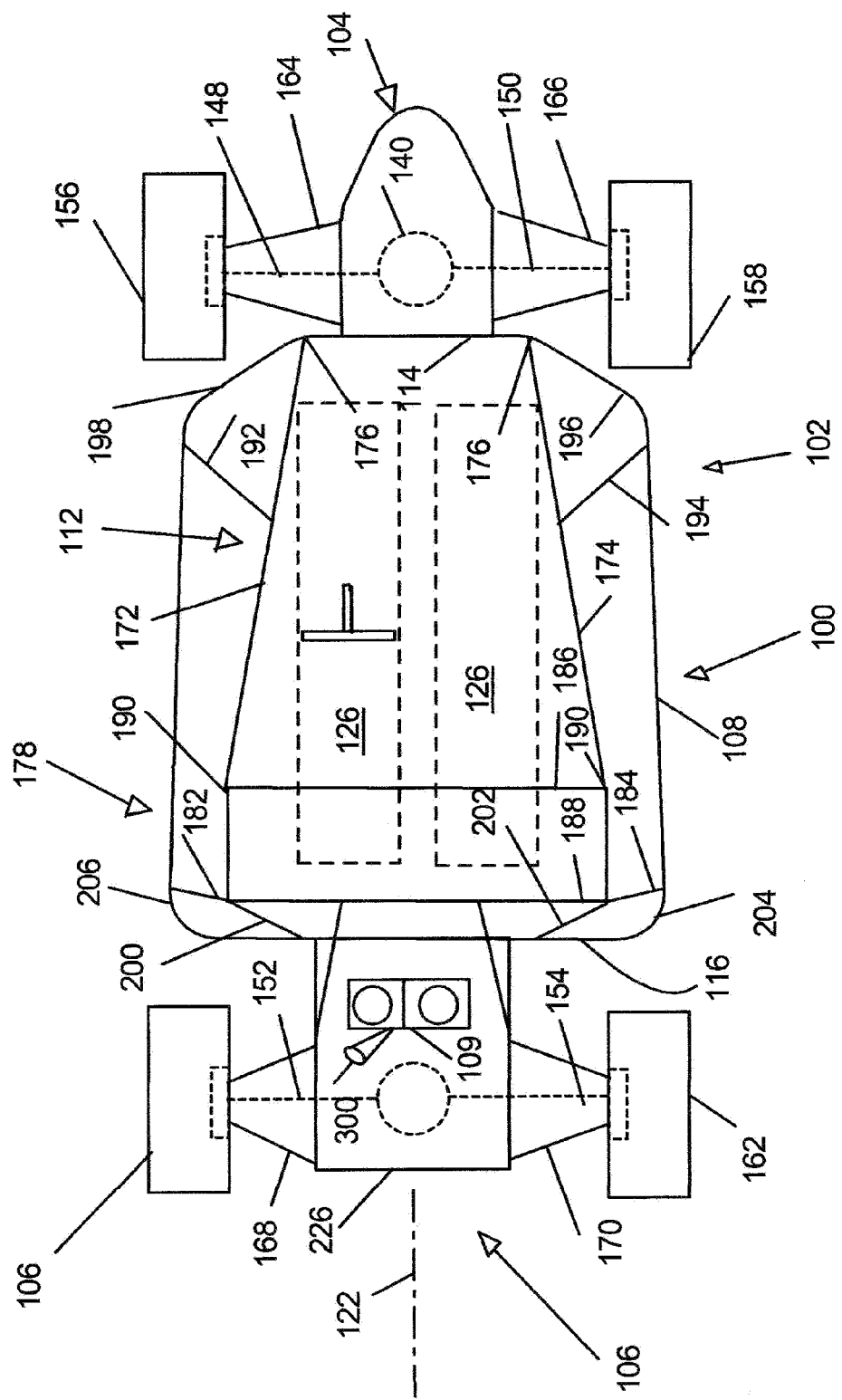
FIG. 1 is a top view by schematic of the hybrid all-terrain, four-wheel drive vehicle of the present invention.

Turning to the drawings, wherein like components are designated by like reference numerals throughout the various figures, attention is initially directed to FIG. 1 which illustrates partially a schematic top view of a vehicle 100 constructed according to the present invention and is considered a hybrid vehicle in that it embodies features not found in vehicles of this size.

In the present invention, the hybrid vehicle 100 has a tubular main chassis section 102, a tubular front chassis section 104 having drive train components therein, a tubular rear chassis section 106 having an engine 109 therein and also other drive train components to be described. Referring to both FIGS. 1 and 2, the main chassis 102, front chassis section 104, rear chassis section 106 and a roll cage 112 are shown as lines representing tubular material unless otherwise stated. The main chassis section 102 comprises an upper frame 108 and a lower frame 110, being similar in shape, with support and strengthening members 128 therebetween, as shown, both vertical and diagonal members are employed and are tubular material. The roll cage 112 is an integral part of the main chassis section 102 and may be constructed of tubular members also as will be described below. The front chassis section 104 is integrally welded to horizontal front tubes 114 of the main chassis 102 as well as a rear chassis section 106 being welded to horizontal rear tubes 116. All of the chassis members are 1½ inch diameter chromoly steel tubing and are TIG welded. Although tubular material is preferred, other types of materials may be acceptable.

Figure 2:
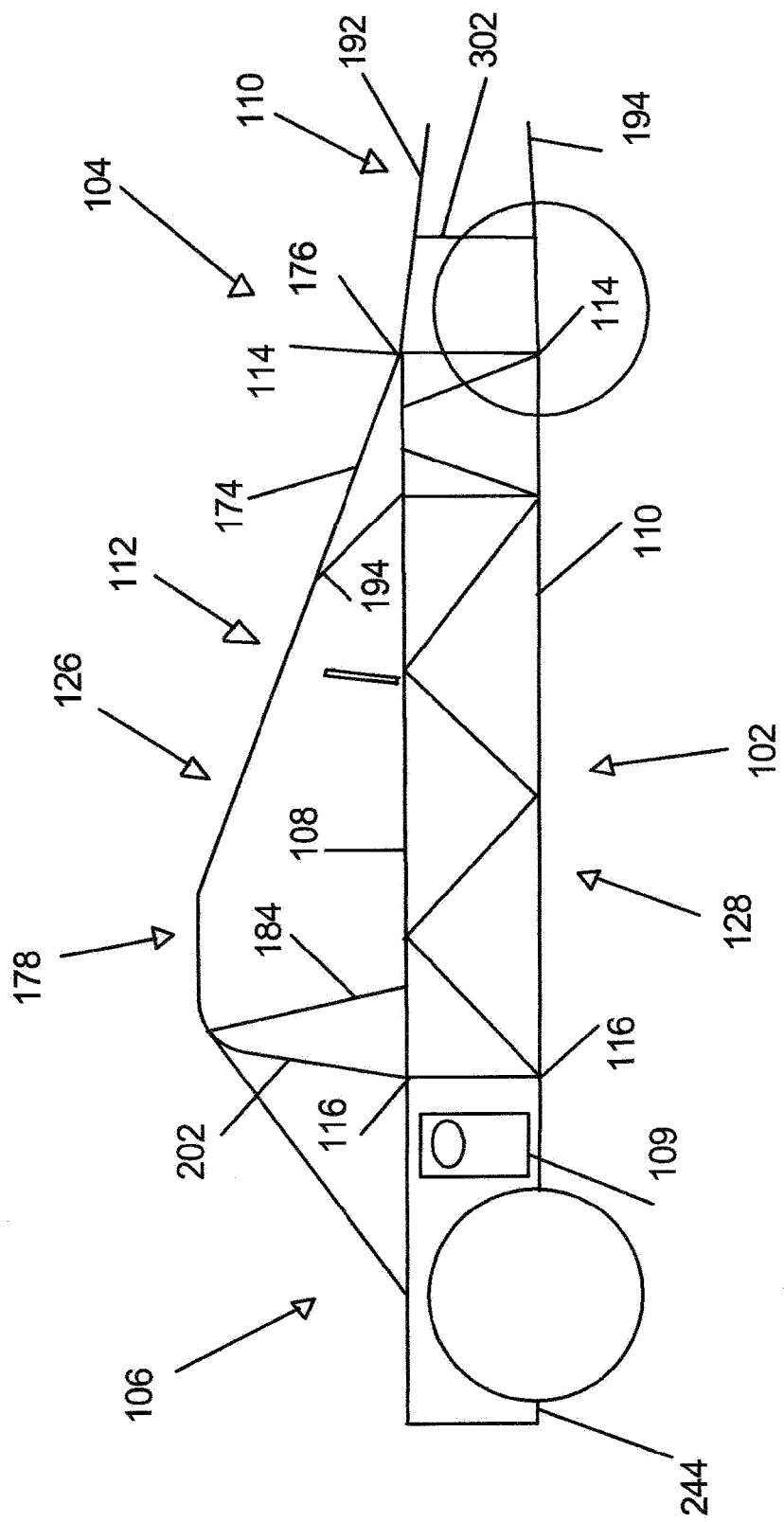
FIG. 2 is a side view by schematic similar to FIG. 1 further including the rear chassis of the present invention.
Figure 3:
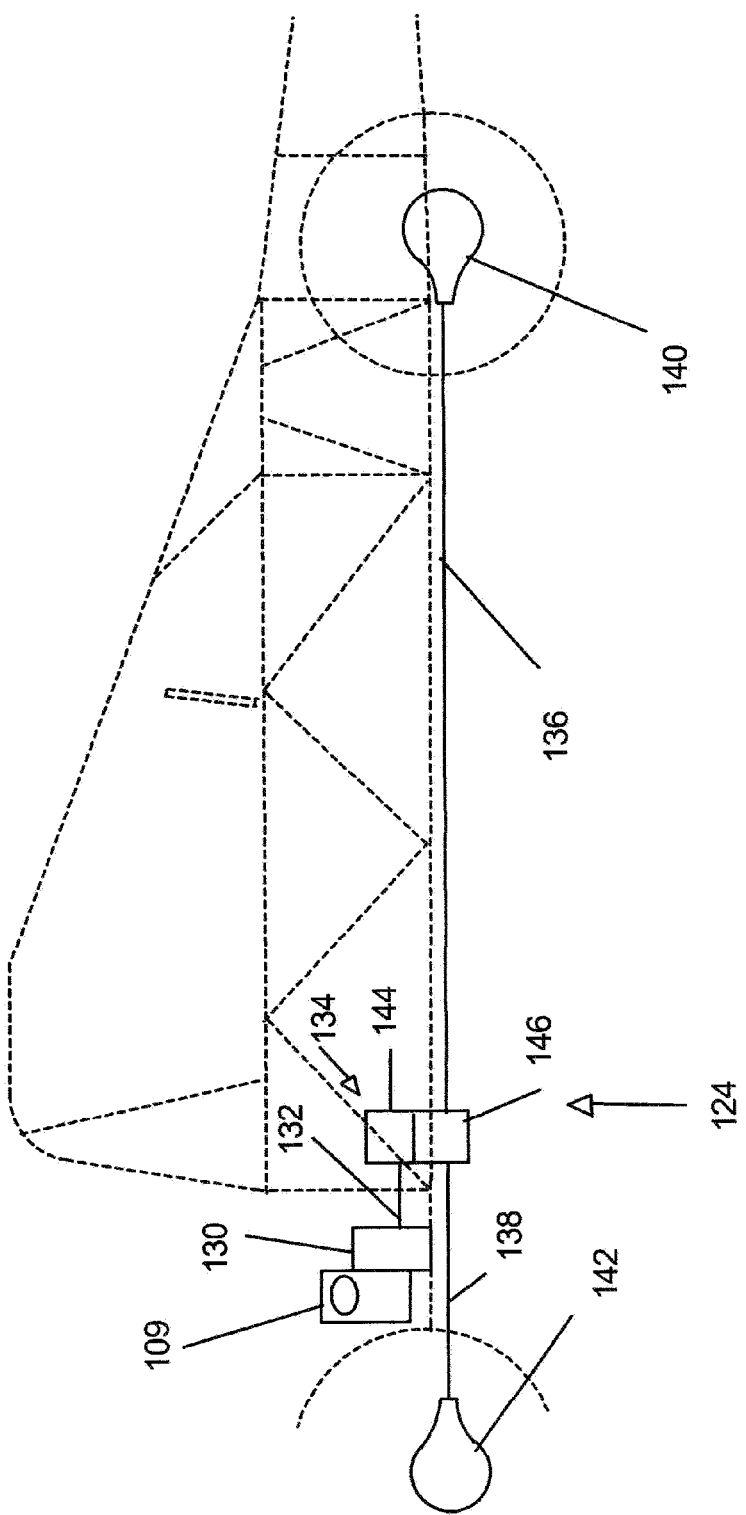
FIG. 3 is a partial side view showing the location of the engine, clutch and transmission/transfer unit of the present invention.
Figure 4:
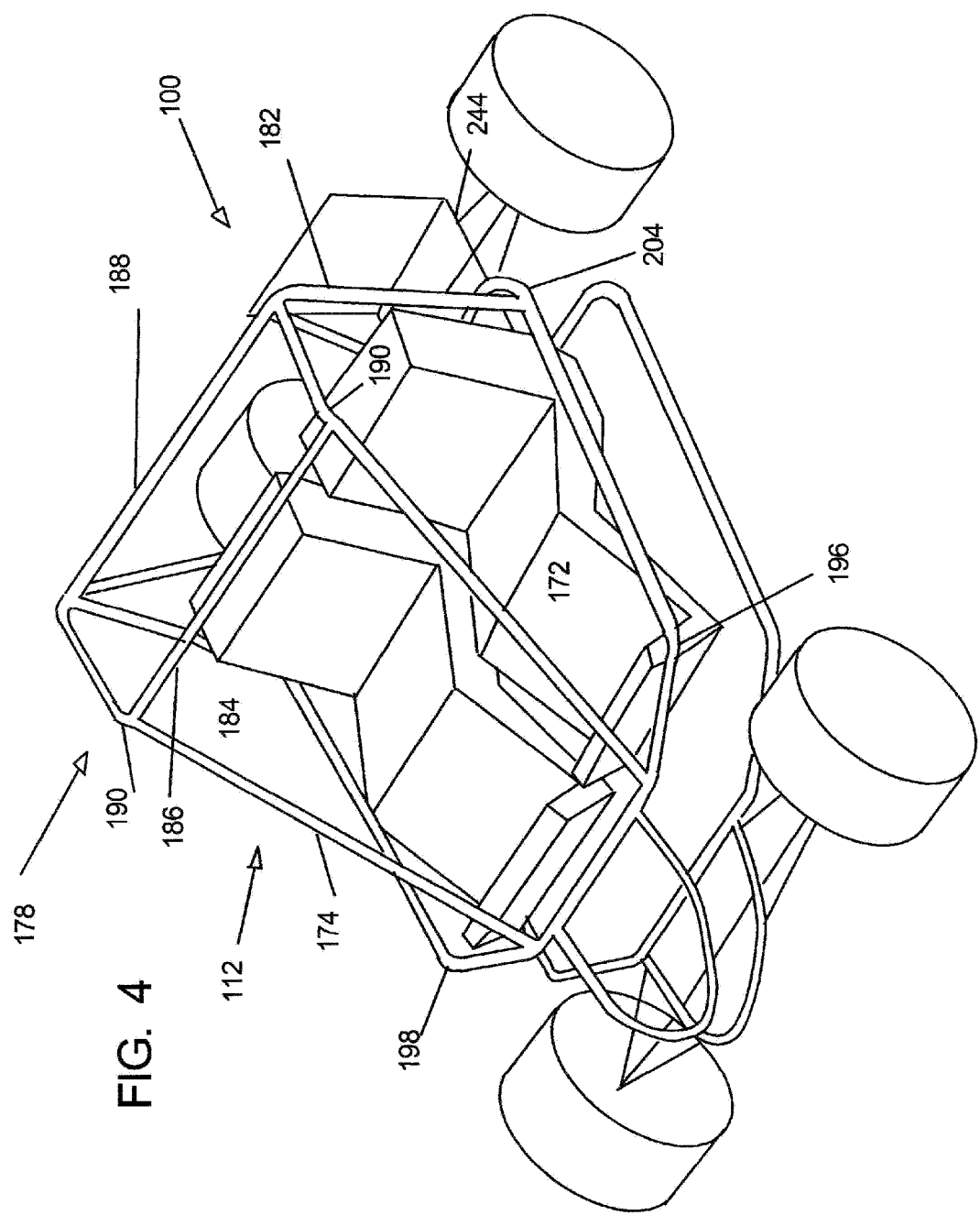
FIG. 4 is a partial 3D schematic illustration of the hybrid all-terrain, four-wheel drive vehicle of the present invention.

The four-wheel vehicle 100 for off-road use has the roll cage 112 shown in FIGS. 1 to 4 comprising a pair of main roll bars 172 and 174 attached to a top of said upper main frame member 108 at a front position 176 and rising up to a level section 178; a pair of main support roll bars 182 and 184 are attached at an end of the level section 178 and to the rear of said upper main frame member 108 to a side near the passenger seats; a pair of horizontal support members 186 and 188 are attached at the ends of the level section 178, one end being at a position 190 approximately where the main roll bars 172 and 174 turn downward to the front of the vehicle 100; a pair of front truss supports 192 and 194, FIGS. 1 and 3, have one end attached to the main support roll bars 172 and 174, the other end attached to said upper frame 108 in proximity to the front corners 196 and 198; also a pair of rear truss support members 200 and 202 are attached to the ends of the level section 178 and the other ends attached to the upper frame 108 near the rear chassis section 106. The roll cage 112 provides an inner box of safety to the driver and passenger and is further described below.

Figure 5:
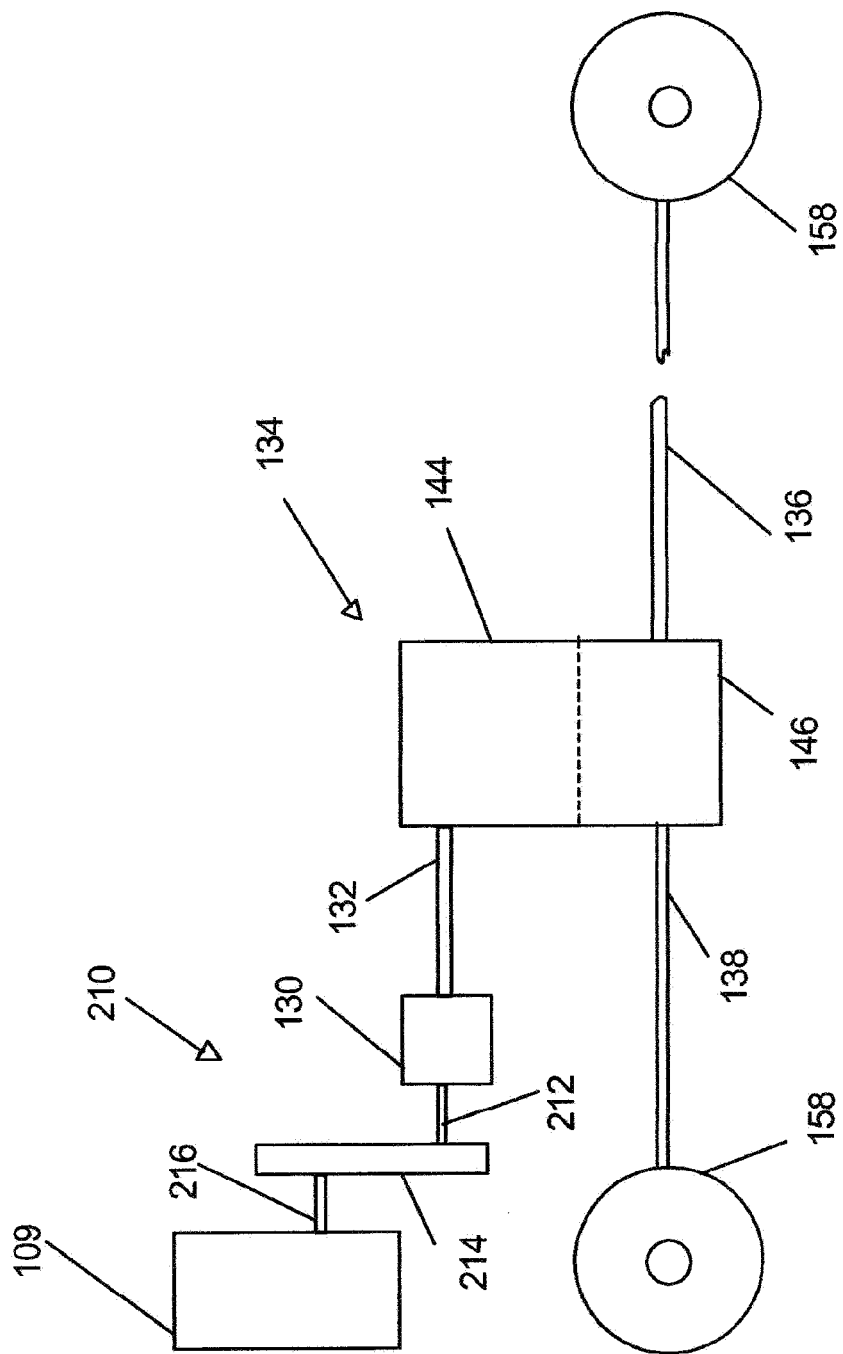
FIG. 5 is a schematic similar to FIG. 3 showing the drive train therein of a preferred embodiment of the hybrid all-terrain, four-wheel drive vehicle of the present invention.
Figure 6:
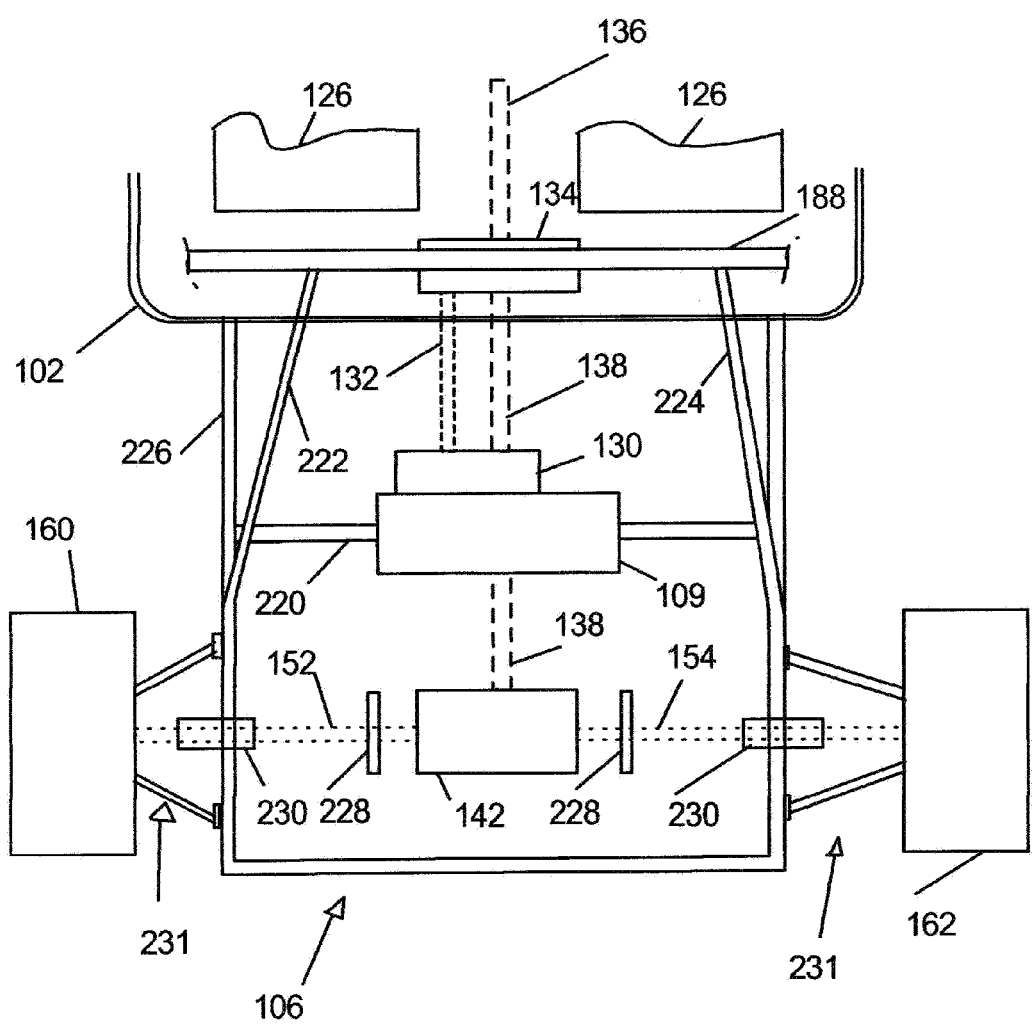
FIG. 6 shows by schematic top view the rear chassis section of the hybrid all-terrain, four-wheel drive vehicle of the present invention.

A V-twin engine 109, FIGS. 1 to 3, and 5 to 7, is mounted horizontal to a chassis axis 122, FIG. 1, on an adjustable motor mount 120, FIG. 7. Referring to FIGS. 3 and 6, a drive train 124 is illustrated showing the V-twin engine 109 mounted behind seats 126. In FIGS. 3 and 5, the drive train 124 is shown by solid lines and the chassis by dashed lines. The engine 109 is connected to a chain drive 210, FIG. 5, that motivates a clutch 130 by shaft 212. The chain drive 210 is driven by an engine shaft 216 having a sprocket thereon that turns a chain 214 that further turns the shaft 212 into the clutch 130. The clutch output shaft 132 is connected to a transmission/transfer unit 134, automatic or manual. By use of the chain drive 210 and the transmission/transfer unit 134, a front drive shaft 136 and rear drive shaft 138 are lowered to be in close alignment with a front differential 140 and a rear differential 142 that minimizes stress on u-joints and differentials. The transmission/transfer unit 134 is mounted between and behind the seats 126. The transmission 144, automatic or manual, of five speeds typically, is connected to a transfer case 146, having a selectable low and high ranges. The differentials 140 and 142 have wheel drive axle shafts 148, 150, 152 and 154 therefrom with appropriate u-joints, two per axle, disk brakes, etc. Each wheel 156, 158, 160, and 162 is mounted to an independent suspension 164, 166, 168, and 170, respectively. Conventional disc brakes are located on each wheel axle. An independent A-arm support may be used in the suspensions. Appropriate instruments and controls are further mounted in the chassis' 102, 104, and 106 for use by the driver such as brakes, steering wheel, speed odometer, rpm gauge, fuel gauge, shifter for the transmission 144 and transfer case 146, not shown. A specification listing is shown below that describes the manufacturer, and part number and the items listed are considered conventional.

FIG. 6 is a top view of the rear chassis section 106 mounted to the main chassis section 102 with the engine 109 and the clutch 130 adjustably mounted therein by use of a adjustable mounting 220, FIG. 7. Rear chassis diagonal support tubes 222 and 224 are mounted to a top rear chassis tube 226 and the roll cage rear horizontal support member 188. The rear differential 142 has wheel drive shafts 152 and 154 therefrom with rotor brakes 228 thereon. Each rear wheel has an independent breakaway "A" arm suspension 231 with a laydown shock absorbers 230 thereon. Not shown are brackets, bolts, nuts, etc., which are all considered conventional automotive parts.

Referring to FIG. 7, the V-twin engine 109 is fixedly mounted in an engine cradle 240 that is mounted with rubber engine mounts 242 to lower rear chassis tube 244. A top adjustable rigid engine mount 246 is mounted to upper rear chassis tube 226. A cross support member 248 of the mount 246 has an engine bracket 250 affixed thereon. Both of the cradle 240 and the mount 246 are of flexible design made to accommodate engines that may be used in the vehicle 100.

The four-wheel vehicle 100 for off-road use has the main chassis 102, FIGS. 1 and 2 with the upper frame 108 and the lower frame 110 being essentially similar in shape and size. Both of the frames 108 and 110 have rounded rear corners 204 and 206; the upper or lower frames also have truncated front corners 196 and 198 for tire clearance.

The vehicle 100 of the present invention is considered to a hybrid in that its size is that between a utility vehicle (UTV) and that of a dune buggy with a power plant almost equal to that in horse power of a dune buggy having a VW bug engine therein. The present engine provides greater torque and responsiveness and gives it an overall performance capability greater than any present vehicle. The present vehicle has an approximate length of 11 feet, 8 feet in width, and about 5 feet in height.

The present vehicle has a substantial load capacity of about 1,200 pounds and towing capacity of about of about 1,500 pounds. The dry weight of the vehicle is about 1,200 pounds.

Further, the vehicle 100 of the present invention provides an off-road vehicle having an exhaust sound from a muffler 300 equivalent to the sound of a traditional hog motorcycle well known to those skilled in the art. The sound of such is available at the website of: http://www.harley-davidson.com/EX/KNO/H101/en/QTEngine_sounds.asp.

The four-wheel vehicle 100 has a chassis, a front suspension section and a roll cage composed of high strength chromoly steel tubing being TIG welded with a diameter of about 1.5 inches. The support and truss members may be of a smaller diameter as well as the roll cage.

The four-wheel vehicle 100 for off-road use in the present invention has strengthening members such as vertical members and diagonal truss members between the upper and lower frames 108 and 110 as shown in FIG. 2. The vertical members are located at or near the joints being shared with roll cage members for increased strength.

The four-wheel vehicle 100 for off-road use has the front suspension section 110 comprising an upper U-frame member 192, and a lower U-frame member 194 with strengthening members therebetween such as member 302.

SPECIFICATION

Although identification of certain parts hereinbelow shows that many of the parts are conventionally available, other parts may be used in the construction of the present hybrid vehicle:

1. Axle, front, Assembly/Differential Assembly; Dana Corporation, Part No. 018AS100-4;
2. Axle, rear, Assembly/Differential Assembly, Dana Corporation, Part No. 018AS103-2;
3. Brake Caliper; Thunder Heart Performance, Part No. BA2025P;
4. Brakes; Wilwood®;
5. Chassis; 1½ inch chromoly steel tubing.
6. Engine; 100 CI (1643 cc), rated output 110 HP with 110 Lb. Ft Torque, Part No. 298-250, air cooled, 45 degree V-Twin, electric start;
7. Gas Tank, 10 gallon;
8. Oil Cooler for Engine; UltraCool, Inc.
9. Seats/Safety Harness; MasterCraft®.
10. Suspension, independent "A" arm front and rear;
11. Tires (front and rear), 28-10×12, 28-12×12.
12. Transmission/Transfer unit; Team Industries, Part No. 421718; Transmission, automatic clutch/manual, 5 speed with reverse/high-low ranges.
13. Dimensions: 72 wide by 96 long; weight, 1200 pounds, length/width/height, 11 ft./8 ft./64 inches.
  Payload; 1200 pounds.
  Towing; 1500 pounds.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A hybrid all-terrain, four-wheel drive vehicle comprising:
    a tubular chassis comprising:
        a main chassis with an upper main frame member, and a lower main frame member,
            a front chassis section with an upper and lower front chassis frame members, and
            a rear chassis section with an upper and lower rear chassis frame members,
        a front suspension connected to said upper and said lower front chassis frame members, and
        strengthening members therebetween said upper main frame member, said lower main frame member, said upper and said lower front chassis frame members, and said upper and said lower rear chassis frame members;
    a roll cage, said roll cage integrally attached to said upper main frame member of said tubular chassis;
    a pair of seats mounted to said tubular chassis;
    a motor mount, said motor mount attached to a rear of said tubular chassis in said rear chassis section;
    a two-cylinder engine, said engine having a displacement from about 100 to about 150 cubic inches, with a horse power from about 100 to about 175, said engine mounted to said motor mount behind said main chassis section and in said rear chassis section;
    a drive train, said drive train connected to said engine, said drive train coupled to two front wheels and two rear wheels of said four-wheel vehicle, said drive train comprising:
        a chain drive, said chain drive connected to said engine;
        a clutch, said clutch connected to said chain drive;
        a transmission, said transmission mounted to said lower main frame member of said main chassis in a position in between said seats, said transmission connected to said clutch;
        a transfer case, said transfer case mounted to said transmission, said transfer case being connected to said transmission, said transfer case having two output drive shafts;
        a rear differential, said rear differential mounted in said rear chassis section with independent suspensions, said rear differential receiving one of the output drive shafts from said transfer case, and having two rear wheel drive shafts to said two rear wheels; and
        a front differential, said front differential mounted in said front chassis section, said front differential receiving the other output drive shaft from said transfer case, and having two wheel drive shafts to two front wheels.

2. The hybrid all-terrain, four-wheel drive vehicle as recited in claim 1, wherein said engine is a V-twin engine.

3. The hybrid all-terrain, four-wheel drive vehicle as recited in claim 2, wherein said V-twin engine is mounted horizontally to a vehicle axis.

4. The hybrid all-terrain, four-wheel drive vehicle as recited in claim 2, wherein said transmission is a five speed automatic transmission.

5. The hybrid all-terrain, four-wheel drive vehicle as recited in claim 2, wherein said V-twin engine is a 45 degree V-twin engine, air cooled, four valves with push rods, and electric start.

6. The hybrid all-terrain, four-wheel drive vehicle as recited in claim 1, wherein said tubular chassis and said roll cage are composed of high strength chromoly steel tubing being TIG welded at joints.

7. The hybrid all-terrain, four-wheel drive vehicle as recited in claim 6, wherein said tubing is approximately 1.5 inches in diameter.

8. The hybrid all-terrain, four-wheel drive vehicle as recited in claim 1, wherein said main chassis has said upper main frame member and said lower main frame member being essentially similar in shape and size.

9. The hybrid all-terrain, four-wheel drive vehicle as recited in claim 8, wherein said upper and said lower main frame members of said main chassis have rounded rear corners, and have truncated front corners for tire clearance.

10. The hybrid all-terrain, four-wheel drive vehicle as recited in claim 8, wherein said strengthening members between said lower main frame member and said upper main frame member comprise vertical members and diagonal truss members jointed integrally thereto.

11. The hybrid all-terrain, four-wheel drive vehicle as recited in claim 10, wherein said vertical members are located at least at joints being shared with said roll cage.

12. The hybrid all-terrain, four-wheel drive vehicle as recited in claim 11, wherein said roll cage comprise:
    a pair of main roll bars attached to a top of said upper frame member at a front position and rising up to a level section;
    a pair of main support roll bars attached at each rear end of the level section and to a rear of said upper frame member;
    a pair of horizontal support members attached at the ends of the level section, one end being at a position approximately where the main roll bar turns downward to the front;
    a pair of front truss supports, one end attached to the main support roll bar, another end attached to said upper main frame member in proximity to a front corner of said upper main frame member; and
    a pair of rear truss supports attached to the ends of the level section and another end attached to said upper frame in the rear chassis section,
    wherein said roll cage provides an inner box of safety to a driver and a passenger.

13. The hybrid all-terrain, four-wheel drive vehicle as recited in claim 1, wherein said front chassis section comprises:
    an upper U-frame member,
    a lower U-frame member, and
    strengthening members therebetween.

14. The hybrid all-terrain, four-wheel drive vehicle as recited in claim 1, wherein said transfer case has a low and high selectable range settings.

15. The hybrid all-terrain, four-wheel drive vehicle as recited in claim 1, further including disc brakes on all of the wheels.

16. The hybrid all-terrain, four-wheel drive vehicle as recited in claim 1, wherein said vehicle has the approximate dimensions of being 11 feet long, 8 feet width, and 5 feet high, and has a dry weight of about 1,200 pounds.

* * * * *